L. ATWATER.
Horse Hay Fork.
No. 73,223.
Patented Jan. 14, 1868.
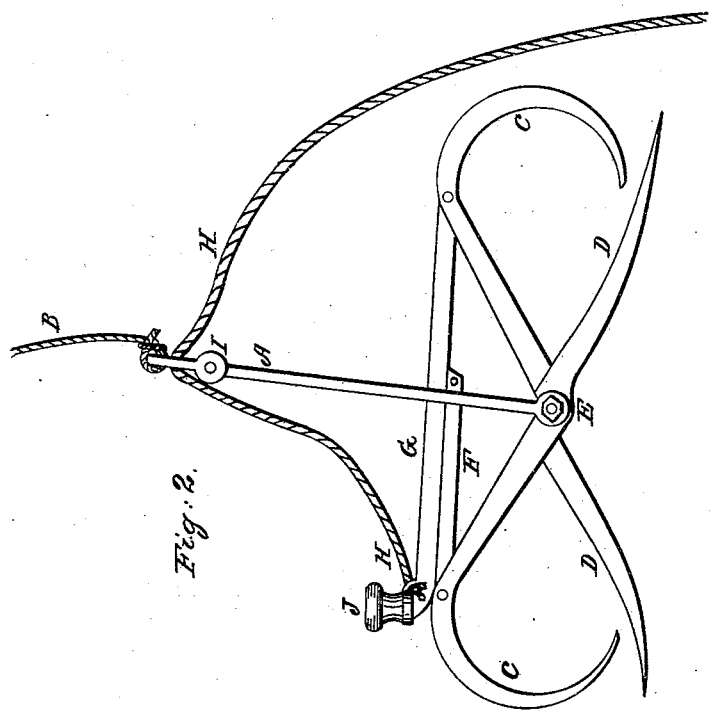
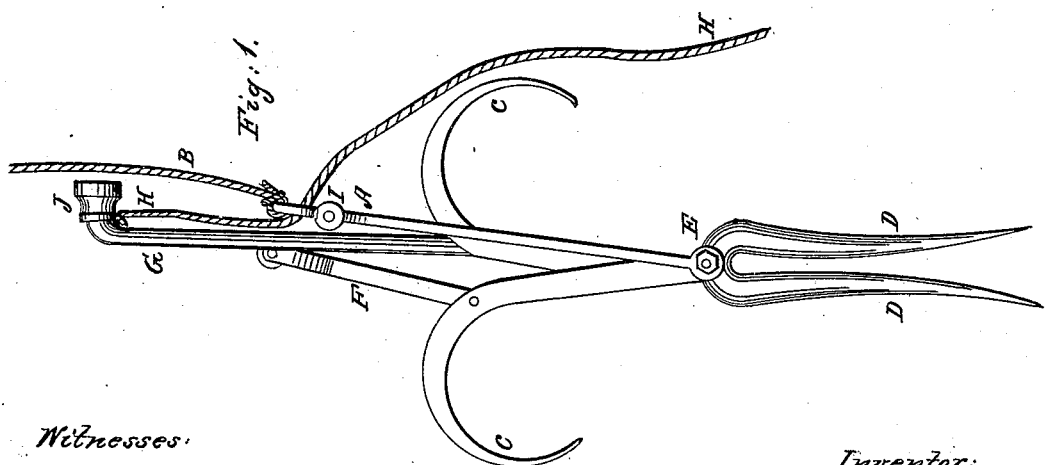
Witnesses:
Samuel J. Parker.
J. J. McElheny
Inventor:
Lewis Atwater.

United States Patent Office.

LEWIS ATWATER, OF ITHACA, NEW YORK.

IMPROVEMENT IN HORSE HAY-FORKS.

Specification forming part of Letters Patent No. 73,223, dated January 14, 1868.

*To all whom it may concern:*

Be it known that I, LEWIS ATWATER, of Ithaca, Tompkins county, New York, have invented an Improved Fork; and I do hereby declare that the following is a full and exact description thereof, reference being had to the accompanying drawings, and to the letters thereon, which are—

Figure 1, a view of my fork as it is ready to enter the hay, clover, or grain and straw, or other article; Fig. 2, a view of the same when it has entered and holds the hay or grain to be lifted.

My object is to make a light, convenient fork, that shall grasp the hay or grain, lift it very perfectly, and release it easily. This I accomplish by making four prongs, that are pushed into the hay, and two or more hooks, that grasp the hay from above. These I hinge on a shaft or other convenient center, by turning on which the changes of opening and closing the fork, and the consequent seizing and releasing of the hay, are made. To retain the fork-load of hay two locking-levers are fastened to the hooks above the axis or hinge, and a cord to open and unload them. This is seen in the drawings, where—

In Fig. 1, which is a side view of the fork as unloaded or about to be used in the hay, A is the handle, to which the lifting-cord B is attached; and C C are the hooks, and D D the prongs, which are thrust into the hay; and E is the shaft or hinge about which the hooks and prongs turn; and F is the short locking-lever, and G is the long locking-lever, both shown in their flexed position, and representing the fork as drawn out of or unloaded of the hay, or as about to be thrust into the hay and be loaded. At H the unlocking-cord is fastened to the lever G, whence it goes about the pulley I, and thence to the hand of the operator.

In Fig. 2 the same letters show the same parts. The prongs D D are shown as extended, and also the hooks C C as grasping the hay or grain; and the levers F and G are seen locking the fork fast in its load. It will be noticed that the prongs are curved somewhat. This is for the purpose of aiding in spreading them while entering their load.

The use of the several parts is clearly seen to be that of the first-represented position, favorable to entering the hay or grain, the extension of the prongs into the hay, the grasping of the hooks, and the locking of the levers until the second position represented is reached, when the horse or other power draws on the cord B and transfers the fork and its load to the desired place, when a slight pull on the cord H releases the hay and unloads the fork by flexing the levers on their hinges.

The other uses of my invention are apparent to those skilled in the art to which it appertains.

Claims.

1. The tines C D, constructed in the form of hooks at their upper ends, and branching below the said hooks to a broad bearing-support near their center and to double prongs at their lower ends, all in one piece, substantially as set forth.

2. The combination of the levers F G and bail A, all constructed and operating substantially as and for the purposes set forth.

3. The combination of the tines C D, levers F G, and bail A, arranged and operating substantially as set forth.

LEWIS ATWATER.

Witnesses:
SAMUEL J. PARKER,
T. J. McELHENY.